US012348944B2

(12) United States Patent
Kajiwara et al.

(10) Patent No.: US 12,348,944 B2
(45) Date of Patent: Jul. 1, 2025

(54) DIAPHRAGM FOR ELECTROACOUSTIC TRANSDUCER

(71) Applicant: FOSTER ELECTRIC COMPANY, LIMITED, Tokyo (JP)

(72) Inventors: Hisami Kajiwara, Tokyo (JP); Masahiro Miwa, Tokyo (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 227 days.

(21) Appl. No.: 17/927,081

(22) PCT Filed: Jun. 2, 2021

(86) PCT No.: PCT/JP2021/020924

§ 371 (c)(1),
(2) Date: Nov. 22, 2022

(87) PCT Pub. No.: WO2021/246427

PCT Pub. Date: Dec. 9, 2021

(65) Prior Publication Data

US 2023/0217199 A1 Jul. 6, 2023

(30) Foreign Application Priority Data

Jun. 2, 2020 (JP) ................................ 2020-096391

(51) Int. Cl.
*H04R 31/00* (2006.01)

(52) U.S. Cl.
CPC ..... *H04R 31/003* (2013.01); *H04R 2307/021* (2013.01); *H04R 2307/029* (2013.01)

(58) Field of Classification Search
CPC ........... H04R 31/003; H04R 2307/021; H04R 2307/029
See application file for complete search history.

(56) References Cited

U.S. PATENT DOCUMENTS

| | | | | |
|---|---|---|---|---|
| 4,471,085 | A | 9/1984 | Yamamoto et al. | |
| 9,818,395 | B2 * | 11/2017 | Kumo | H04R 31/003 |
| 10,645,509 | B2 * | 5/2020 | Itano | H04R 9/025 |
| 11,019,443 | B2 * | 5/2021 | Yoshioka | H04R 9/06 |
| 2002/0100635 | A1 | 8/2002 | Inoue et al. | |

(Continued)

FOREIGN PATENT DOCUMENTS

| | | | |
|---|---|---|---|
| CN | 105113038 | A | 12/2015 |
| JP | S58-153491 | A | 9/1983 |

(Continued)

OTHER PUBLICATIONS

Aug. 24, 2021, International Search Report issued for related PCT application No. PCT/JP2021/020924.

(Continued)

*Primary Examiner* — Forrest M Phillips
(74) *Attorney, Agent, or Firm* — Paratus Law Group, PLLC

(57) ABSTRACT

An aspect of the present invention is directed to a diaphragm for an electroacoustic transducer, and according to the diaphragm for an electroacoustic transducer, in a base material made of a fiber material mainly composed of cellulose fibers, a mixed layer in which the fiber material and silk nanofibers are mixed is formed.

10 Claims, 9 Drawing Sheets

(56) References Cited

U.S. PATENT DOCUMENTS

| | | | | |
|---|---|---|---|---|
| 2007/0131478 | A1 | 6/2007 | Okazaki et al. | |
| 2016/0134972 | A1 | 5/2016 | Shibuya et al. | |
| 2018/0270595 | A1 | 9/2018 | Hiraoka | |
| 2019/0040110 | A1 | 2/2019 | Ittah et al. | |
| 2019/0166445 | A1* | 5/2019 | Itano | H04R 7/122 |
| 2020/0077195 | A1* | 3/2020 | Wang | H04R 31/003 |
| 2020/0077217 | A1* | 3/2020 | Yoshioka | H04R 7/18 |
| 2020/0255619 | A1* | 8/2020 | Takahashi | C08J 9/00 |
| 2021/0228684 | A1* | 7/2021 | Delisle | A61K 47/02 |
| 2021/0385580 | A1 | 12/2021 | Kajiwara | |
| 2021/0409869 | A1* | 12/2021 | Tokura | H04R 31/003 |

FOREIGN PATENT DOCUMENTS

| | | | |
|---|---|---|---|
| JP | H11-285094 | A | 10/1999 |
| JP | 2003-116199 | A | 4/2003 |
| JP | 2005-236497 | A | 9/2005 |
| JP | 2017-046258 | A | 3/2017 |
| JP | 2018-152740 | A | 9/2018 |
| WO | WO 2015/011903 | A1 | 1/2015 |
| WO | WO 2020/080123 | A1 | 4/2020 |

OTHER PUBLICATIONS

Aug. 24, 2021, International Search Opinion issued for related PCT application No. PCT/JP2021/020924.

Jun. 4, 2024, European Search Report issued for related EP Application No. 21817057.9.

* cited by examiner

DIAPHRAGM FOR ELECTROACOUSTIC TRANSDUCER

CROSS REFERENCE TO PRIOR APPLICATION

This application is a National Stage Patent Application of PCT International Patent Application No. PCT/JP2021/020924 (filed on Jun. 2, 2021) under 35 U.S.C. § 371, which claims priority to Japanese Patent Application No. 2020-096391 (filed on Jun. 2, 2020), which are all hereby incorporated by reference in their entirety.

TECHNICAL FIELD

The present invention relates to a diaphragm for an electroacoustic transducer used in a speaker, a microphone, and the like.

BACKGROUND ART

A diaphragm for an electroacoustic transducer is required to have a low density, a high Young's modulus, an appropriate internal loss, and the like, and a material having optimum physical properties is appropriately selected according to the use of a speaker or a microphone. Various materials may be used as the diaphragm, and cellulose fibers (mainly pulp) are often used in view of performance, cost, and the like, but desired physical properties may not be obtained in some cases.

Therefore, in such a diaphragm, the physical properties described above are compensated by applying other materials to a surface layer of a base material made of cellulose fibers. For example, Patent Literature 1 describes a diaphragm in which cellulose nanofibers are applied on a surface layer of a base material layer made of cellulose fibers.

PRIOR ART DOCUMENT

Patent Literature

Patent Literature 1: WO2015-011903A1

SUMMARY OF INVENTION

Problem to be Solved by the Invention

However, in Patent Literature 1, the surface layer of the base material layer is coated with cellulose nanofibers, but in this case, the problem is that the internal loss (tan δ) is reduced.

The present invention has been proposed in view of the above, and an object of the present invention is to provide a diaphragm for an electroacoustic transducer that achieves an appropriate Young's modulus and internal loss with respect to physical property values of a base material.

Means for Solving the Problem

In order to achieve the above object, in a diaphragm for an electroacoustic transducer according to the present invention, in a base material made of a fiber material mainly composed of cellulose fibers, a mixed layer in which the fiber material and silk nanofibers are mixed is formed.

In the diaphragm for an electroacoustic transducer, the mixed layer may be formed at a surface layer side of the base material.

In the diaphragm for an electroacoustic transducer, the silk nanofibers may have an average fiber length of 10 μm or less.

In the diaphragm for an electroacoustic transducer, the mixed layer may be formed by spraying a suspension containing the silk nanofibers onto one surface of the base material while dehydrating the suspension from the other surface side of the base material by suction.

In the diaphragm for an electroacoustic transducer, the surface layer of the base material may further include a reinforcing layer in which the fiber material, the silk nanofibers, and a reinforcing material are mixed.

In the diaphragm for an electroacoustic transducer, the reinforcing material may be made of a material containing mica.

In the diaphragm for an electroacoustic transducer, the reinforcing material may be made of a material containing cellulose nanofibers.

In the diaphragm for an electroacoustic transducer, the reinforcing layer may be formed in the mixed layer by spraying a suspension containing the reinforcing material and the silk nanofibers onto the one surface of the base material while dehydrating the suspension from the other surface side of the base material.

Effects of Invention

As described above, according to the present invention, it is possible to provide a diaphragm for an electroacoustic transducer that achieves an appropriate Young's modulus and internal loss with respect to physical property values of a base material.

EMBODIMENTS FOR CARRYING OUT THE INVENTION

Hereinafter, a diaphragm for an electroacoustic transducer (hereinafter, also referred to as a diaphragm) according to an embodiment of the present invention will be described.

Figure 1:
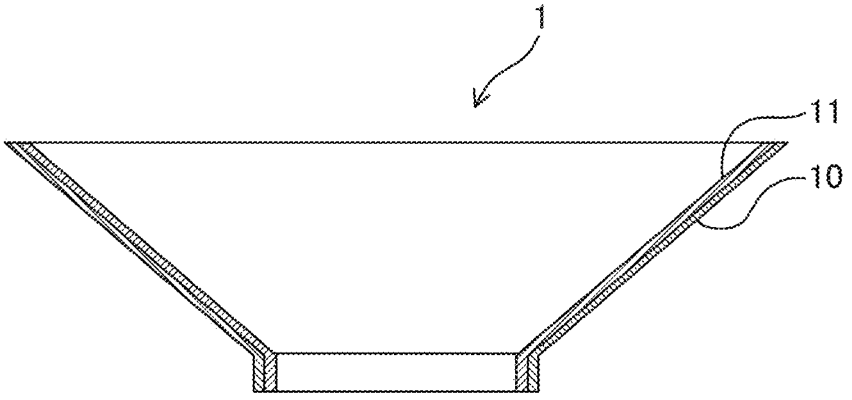
FIG. 1 is a cross-sectional view of a diaphragm for an electroacoustic transducer according to an embodiment of the present invention.
Figure 2:
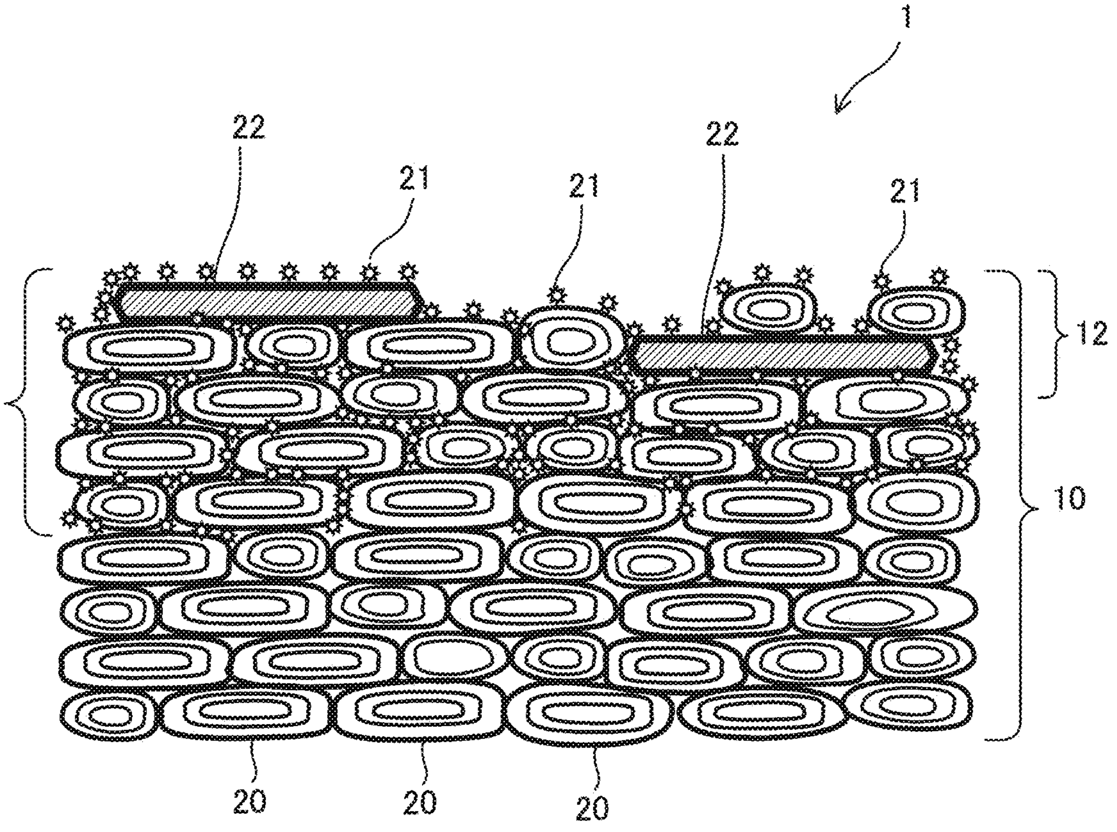
FIG. 2 is a schematic view of a cross section of a diaphragm according to Example A1 of the present invention.
Figure 3:
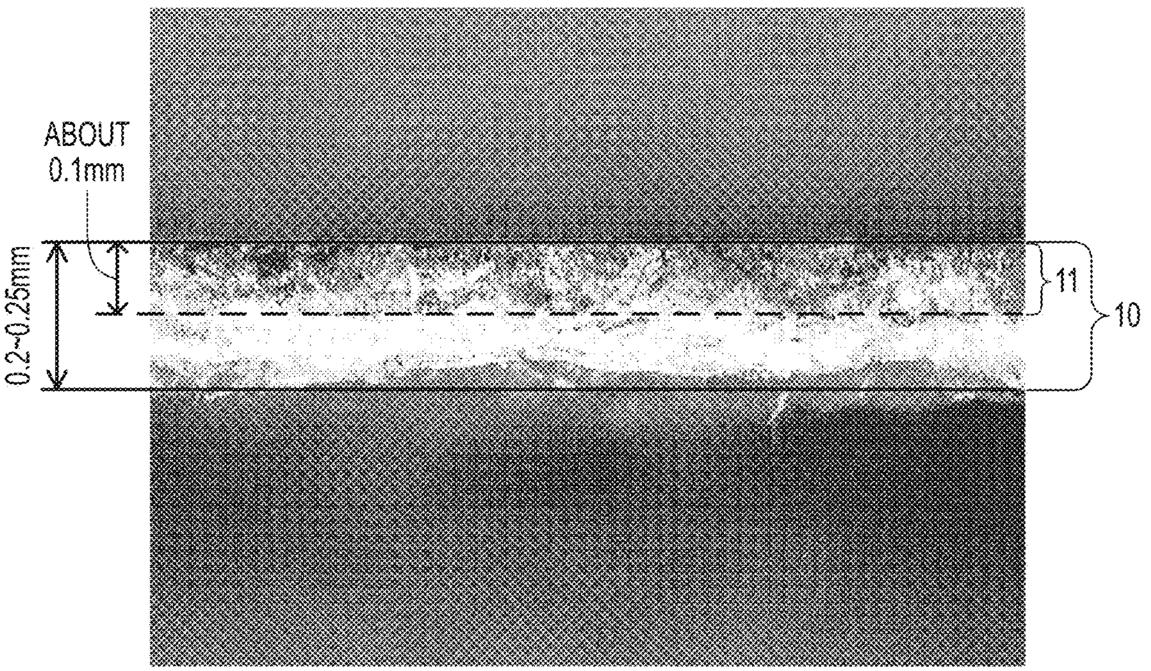
FIG. 3 is an enlarged image of the cross section of the diaphragm according to Example A1 of the present invention.
Figure 4:
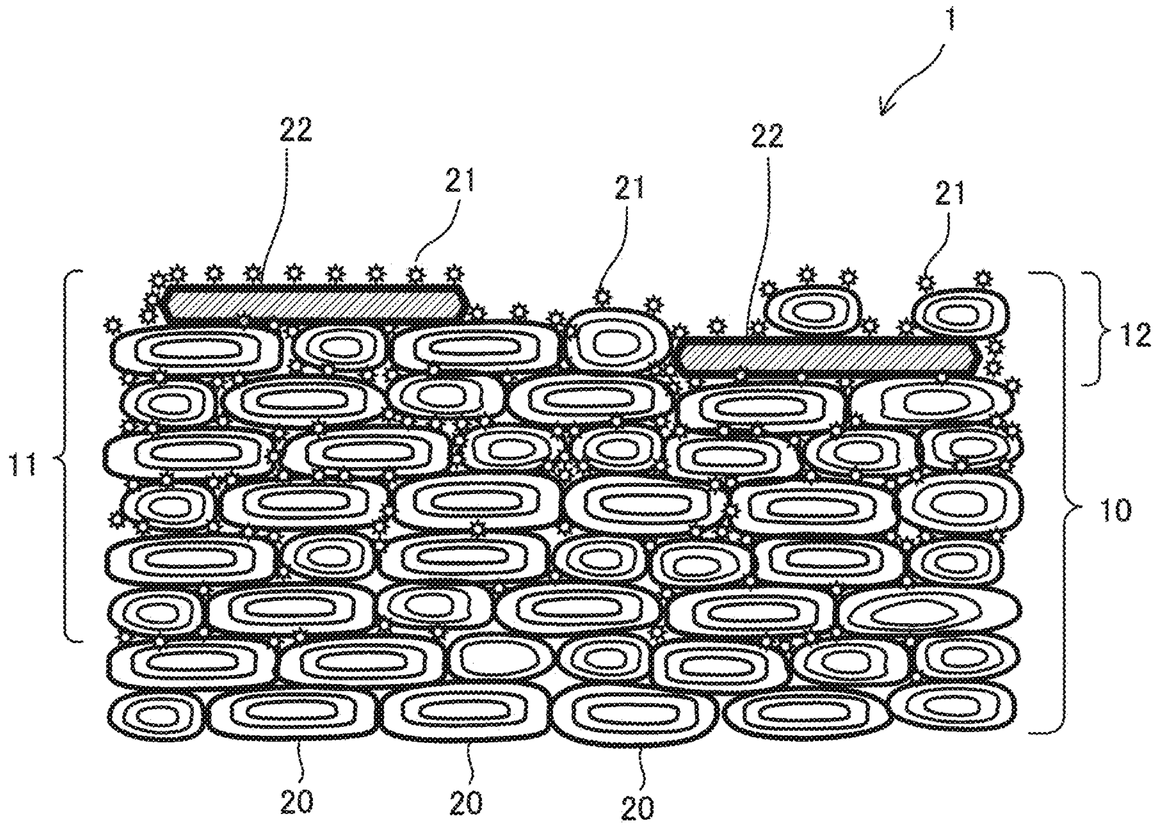
FIG. 4 is a schematic view of a cross section of a diaphragm according to Example A3 of the present invention.
Figure 5:
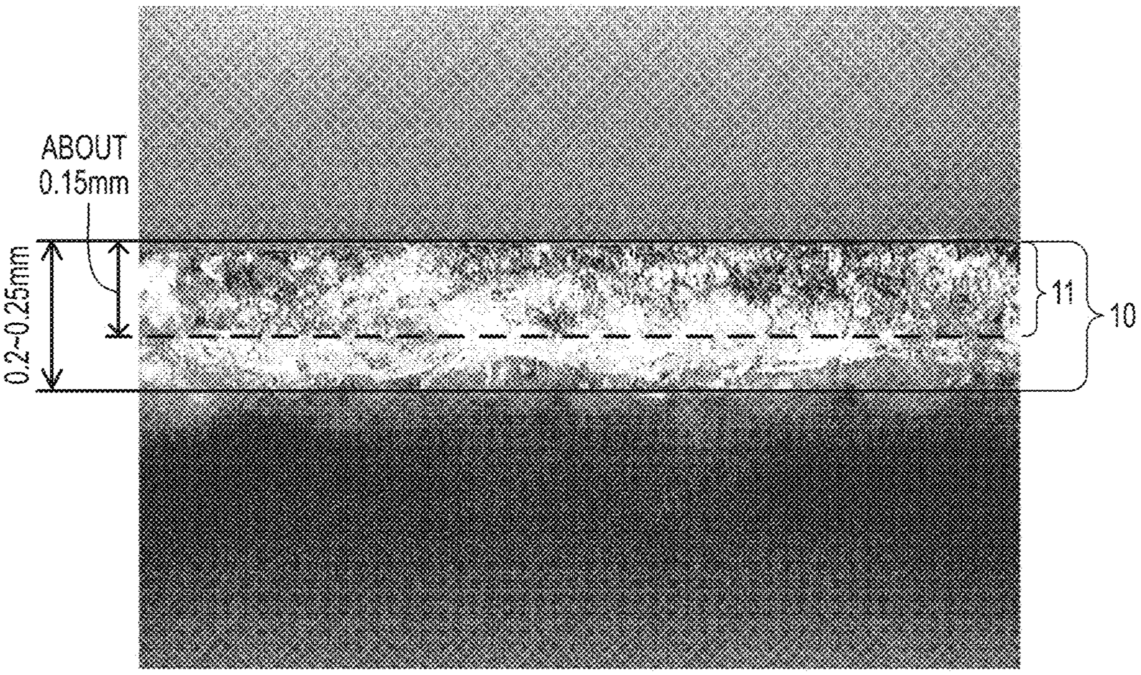
FIG. 5 is an enlarged image of the cross section of the diaphragm according to Example A3 of the present invention.

FIG. 1 is a cross-sectional view of the diaphragm for an electroacoustic transducer according to the embodiment of the present invention. FIG. 2 is a schematic view of a cross section of a diaphragm according to Example A1 of the present invention, which will be described later, and FIG. 3 is an enlarged image of the cross section of the diaphragm taken with a microscope. FIG. 4 is a schematic view of a cross section of a diaphragm according to Example A3 of the present invention, which will be described later, and FIG. 5 is an enlarged image of the cross section of the diaphragm taken with a microscope.

A diaphragm 1 (a diaphragm for an electroacoustic transducer) shown in FIG. 1 is a diaphragm for a speaker according to the embodiment of the present invention, and has a cone shape (truncated cone shape). An opening side of the diaphragm 1 having a small diameter is attached to a vibration source of a speaker such as a voice coil (not shown). An inner surface of a conical portion of the diaphragm 1 becomes a sound radiation surface (front surface) and a surface visually recognizable from outside. On the other hand, various devices of the speaker (not shown) are disposed on an outer surface (back surface) side of the conical portion of the diaphragm 1.

First, a configuration of the diaphragm 1 according to the present invention will be described with reference to FIGS. 2 and 3 according to Example A1 of the present invention. In the diaphragm 1, in a base material 10 made of a fiber material mainly composed of cellulose fibers 20, a mixed layer 11 in which the fiber material and silk nanofibers 21 are mixed is formed. In diaphragms according to Example A1 and Example A3 which will be described later, a reinforcing layer 12 in which the fiber material, the silk nanofibers 21, and mica 22 as a reinforcing material are mixed is formed at a surface layer on a front surface side of the base material 10.

Here, the base material 10 is made by preparing a liquid of the cellulose fibers 20 (fiber material) beaten at a beating degree of 10° SR or more and 85° SR or less and making paper into a diaphragm shape. The cellulose fibers 20 of the present embodiment are a mixture of wood pulp made from conifer and non-wood pulp made from kenaf. As the cellulose fibers 20, other pulp such as wood pulp or non-wood pulp can be used, and a mixture of wood pulp and non-wood pulp, wood pulp alone, or non-wood pulp alone may be used. An average fiber diameter (maximum width) of the cellulose fibers 20 is preferably 5 μm or more and 90 μm or less. A fiber length of the cellulose fibers 20 is not particularly limited, and those having a fiber length used for general papermaking can be appropriately selected.

As shown in FIG. 2, the mixed layer 11 is a layer in which the silk nanofibers 21 are mixed in gaps between the cellulose fibers 20. The silk nanofibers 21 have an average fiber diameter of about 100 nm on the nanometer level, have an average fiber diameter smaller than that of the cellulose fibers 20, and enter between the cellulose fibers 20. In the example shown in the schematic view of FIG. 2, the silk nanofibers 21 are present from an outermost surface of the base material 10 to a vicinity of a central portion in a thickness direction.

As shown in FIG. 2, the reinforcing layer 12 is a layer in which the silk nanofibers 21 and mica 22 as a reinforcing material are mixed at the surface layer on the front surface side of the base material 10. Since the mica 22 has a grain size larger than the average fiber diameter of the silk nanofibers 21, the mica 22 does not deeply into the base material 10 and remains at the surface layer of the base material 10. The mica 22 can increase a rigidity of the surface layer of the diaphragm 1 and increase a propagation speed of the diaphragm surface layer.

FIG. 2 is a schematic view of the diaphragm 1, and in FIG. 2, in order to make a relation between the cellulose fibers 20, the silk nanofibers 21, and the mica 22 easy to understand, the respective elements are exaggerated from the actual sizes. In practice, as shown in FIG. 3, the base material 10 has an average thickness of 0.2 mm or more and 0.25 mm or less, whereas the mixed layer 11 is formed at the surface layer of the base material 10, and the mixed layer 11 has an average thickness of about 0.1 mm, which is about half the thickness of the base material 10. In FIG. 3, in order to make it easier to identify the mixed layer 11 of the base material 10, the diaphragm 1 is formed by staining only the silk nanofibers 21 without staining the cellulose fibers 20 of the base material 10. As shown in FIG. 3, the front surface side of the diaphragm 1 is colored, and it can be observed that the mixed layer 11 is formed at the front surface side of the diaphragm 1 by the silk nanofibers 21.

The mixed layer 11 and the reinforcing layer 12 can be formed by inserting the silk nanofibers 21 and the mica 22 into the surface layer, at the front surface side, of the base material 10 by spraying a suspension containing the silk nanofibers 21 and the mica 22 in water onto the front surface (one surface) of the base material 10 by, for example, a spray application method while dehydrating the suspension from a back surface (the other surface) side of the base material 10 that is made into paper by suction. Thereafter, the diaphragm 1 having the mixed layer 11 is manufactured through molding and drying processes by hot pressing or the like. In this way, by spraying the suspension containing the silk nanofibers 21 and the mica 22 onto the front surface of the base material 10 and applying the suspension to the base material 10 in a state where the suspension is dehydrated from the back surface side of the base material 10 by suction, the silk nanofibers 21 and the mica 22 can be smoothly attached to the surface layer of the base material 10 without disturbing the arrangement of the cellulose fibers 20 of the base material 10 due to the moisture of the suspension, and the reinforcing layer 12 in which the cellulose fibers 20, the silk nanofibers 21, and the mica 22 are mixed can be thinly and uniformly formed. By dehydrating the suspension from the back surface side of the base material 10 that is made into paper by suction, of the silk nanofibers 21 and the mica 22 contained in the sprayed suspension, only finer silk nanofibers 21 can penetrate deeply between the cellulose fibers 20, and the mixed layer 11 can be formed thicker than the reinforcing layer 12. On the other hand, since the mica 22 has a grain size larger than the average fiber diameter of the silk nanofibers 21 and larger than the gaps between the cellulose fibers 20, a part of the mica 22 enters the gaps, but most of the mica 22 easily remains in the surface layer of the base material 10 and the mica 22 is uniformly present in the surface layer, so that the reinforcing layer 12 can be formed at a front surface side of the mixed layer 11. The suspension does not necessarily contain the mica 22 as a reinforcing material, and a mixed layer may be formed by spraying a suspension containing the silk nanofibers 21 and not containing the mica 22 without forming a reinforcing layer on a diaphragm.

The silk nanofibers 21 are refined to have an average fiber diameter in the nanometer level by loosening raw material silk fibers, which are natural fibers containing protein as a main component, with a mechanical impact force. The silk nanofibers 21 used in the examples of the present invention are refined to have an average fiber diameter of about 100 nm and an average fiber length of 10 μm or less. As described above, since the silk nanofibers 21 used in the examples of the present invention have a small average fiber diameter, the silk nanofibers 21 easily penetrate between the cellulose fibers 20 and easily affect physical properties of the base material 10. Since the silk nanofibers 21 have high dispersibility with water, the silk nanofibers 21 are uniformly dispersed in a suspension, and the silk nanofibers 21 can be uniformly applied on a base material. Therefore, it is possible to form a diaphragm having uniform physical properties over the entire surface of the diaphragm.

If the grain size of the mica 22 is too small, it will be difficult to identify the mica 22 at a diaphragm surface, and if the grain size is too large, the texture will be rough and the decorativeness of the diaphragm 1 may be deteriorated. If the grain size of the mica 22 is too small, it will be difficult to retain the mica 22 at the surface layer of the base material 10, and if the grain size of the mica 22 is too large, it will be difficult to dispose the mica 22 between the cellulose fibers 20. Therefore, the grain size of the mica 22 is preferably 10 μm or more and 500 μm or less. The mica 22 may be natural mica or synthetic mica. Further, the mica 22 that is coated with titanium oxide, iron oxide, or the like and has gloss is preferable for improving the decorativeness of the diaphragm 1. By using mica having a large grain size, the mica can be retained in a surface layer of a diaphragm to increase a rigidity of the surface layer, and a propagation speed of the surface layer of the diaphragm can be increased. The average fiber diameter of the silk nanofibers 21 is smaller than the grain size of the mica 22 and the average fiber diameter of the cellulose fibers 20, and it is difficult to visually observe the silk nanofibers 21 at a surface layer of a diaphragm. However, by mixing and spraying the silk nanofibers 21 and the mica 22, the mica 22 having a large grain size can be observed, and it can be visually observed that the silk nanofibers 21 are surely sprayed. Therefore, the quality of a diaphragm as an industrial product can be assured.

First Example

Hereinafter, comparison results of a Young's modulus and an internal loss using measurement samples of diaphragms for an electroacoustic transducer of a first example and a comparative example according to the present invention will be described.

Comparative Example a uses a measurement sample of a base material made of only cellulose fibers. Examples A1 and A3 use a measurement sample in which a mixed layer in which cellulose fibers and silk nanofibers are mixed in a base material made of cellulose fibers and a reinforcing layer in which the cellulose fibers of the base material, silk nanofibers, and mica are mixed in a surface layer of the base material are formed. Examples A2 and A4 use a measurement sample in which a mixed layer in which cellulose fibers and silk nanofibers are mixed is formed on a base material made of cellulose fibers. Since Examples A2 and A4 do not contain mica, no reinforcing layer is formed. Conditions of the measurement samples in the examples (masses of silk nanofibers and mica relative to mass of measurement sample: % by mass) are shown in Table 1.

TABLE 1

| | Comparative Example a | Example A1 | Example A2 | Example A3 | Example A4 |
|---|---|---|---|---|---|
| Silk nanofibers | None | 1.90% | 2.00% | 4.75% | 5.00% |
| Mica | None | 0.10% | None | 0.25% | None |

Each of the prepared measurement samples is prepared such that a total sample mass (basis weight) is constant at 170 g/m$^2$, and is cut into a sample having a length of 40 mm and a width of 5 mm. Specifically, the samples of Examples A1 and A3 are formed by making the cellulose fibers of the base material into paper with a papermaking mesh, and then spraying a suspension having an adjusted mass ratio of the silk nanofibers to the mica of 95:5 onto a front surface of the base material while dehydrating the suspension from a back surface side of the base material by suction. In Example A1, the suspension is sprayed such that masses of the silk nanofibers and the mica are 2.00% by mass of the total sample mass, the silk nanofibers are 1.90% by mass of the total sample mass, and the mica is 0.10% by mass of the total sample mass. Similarly, Example A3 is formed by spraying the suspension such that masses of the silk nanofibers and the mica are 5.00% by mass of the total sample mass, the silk nanofibers are 4.75% by mass of the total sample mass, and the mica is 0.25% by mass of the total sample mass. The samples of Examples A2 and A4 are formed by making the cellulose fibers of the base material into paper with a papermaking mesh, and then spraying a suspension of silk nanofibers onto a front surface of the base material while dehydrating the suspension from a back surface side of the base material by suction. Example A2 is formed by spraying the suspension such that a mass of the silk nanofibers is 2.00% by mass of the total sample mass, and Example A4 is formed by spraying the suspension such that a mass of the silk nanofibers is 5.00% by mass of the total sample mass.

FIGS. 4 and 5 are a schematic view of a cross section of a diaphragm according to Example A3 of the present invention and an enlarged image taken with a microscope, and correspond to FIGS. 2 and 3 of Example A1.

As shown in FIG. 4, in the mixed layer 11 of Example A3, the mass of the silk nanofibers is 4.75% by mass, which is larger than 1.90% by mass of Example A1, and the silk nanofibers 21 are present from an outermost surface of the base material 10 to a vicinity of a back surface in a thickness direction. As shown in FIG. 5, the base material 10 has an average thickness of 0.2 mm or more and 0.25 mm or less, whereas the mixed layer 11 has a thickness of about 0.15 mm.

In the base materials of Comparative Example a and Examples A1 to A4, a mixture of 50% by mass of NUKP and 50% by mass of kenaf beaten at a beating degree of 20° SR is used as the cellulose fibers.

As the silk nanofibers of Examples A1 to A4, Model KCo-30005 manufactured by SUGINO MACHINE LIMITED CO., LTD. was used. The silk nanofibers are refined to have an average fiber diameter of about 100 nm and an average fiber length of 10 μm or less by loosening silk fibers with a mechanical impact force. As the mica of Examples A1 and A3, model MS-100R manufactured by Nihon Koken Kogyo Co., Ltd. was used. The mica has a grain size of 20

μm to 100 μm, and natural mica is used as a base and coated with titanium oxide and iron oxide to impart gloss. In Examples A1 and A3, a mass-based mixing ratio of the silk nanofibers to the mica is silk nanofibers:mica=95:5.

Figure 6:
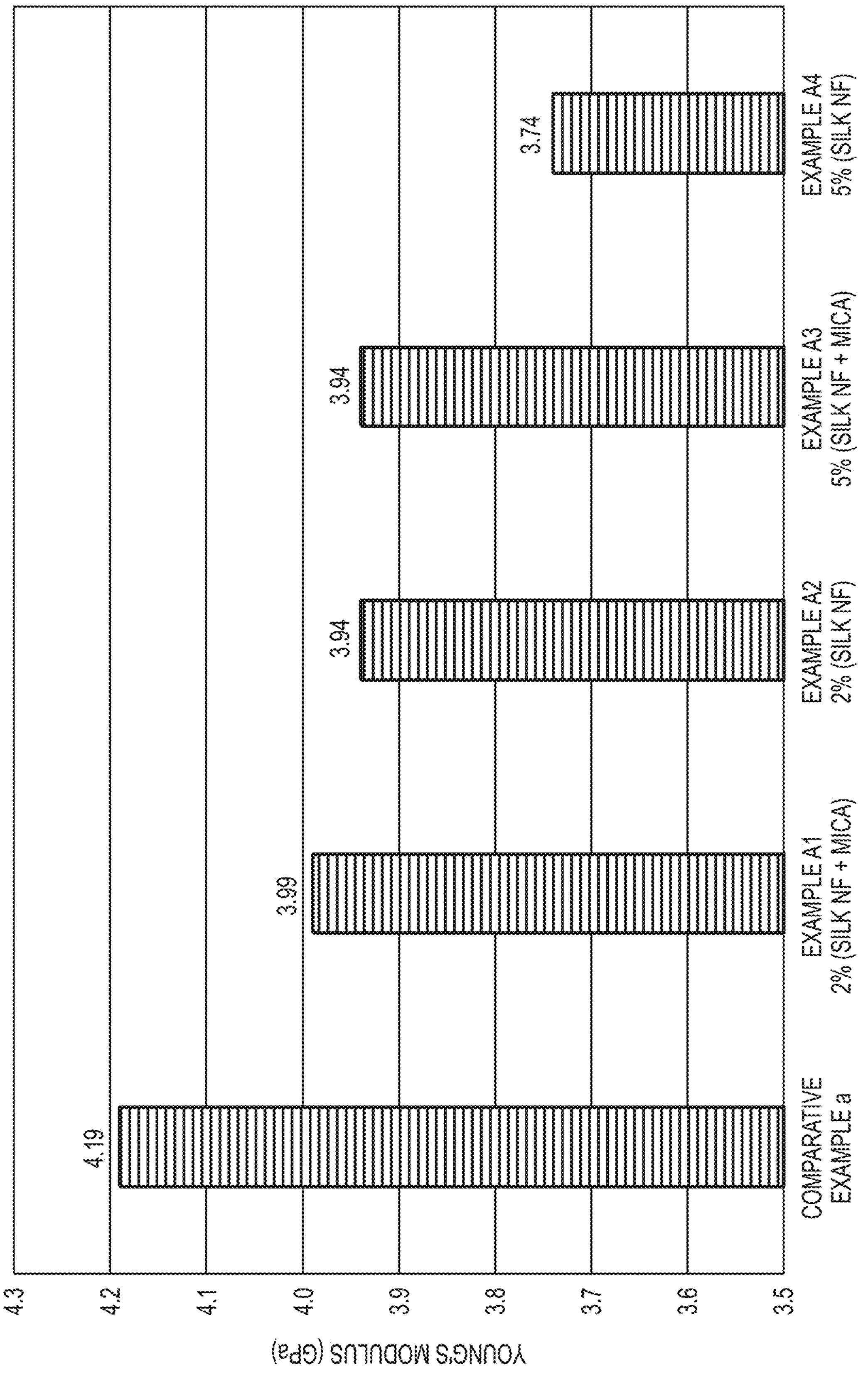
FIG. 6 is a graph comparing a Young's modulus of Comparative Example a and Examples A1 to A4 according to the embodiment of the present invention.
Figure 7:
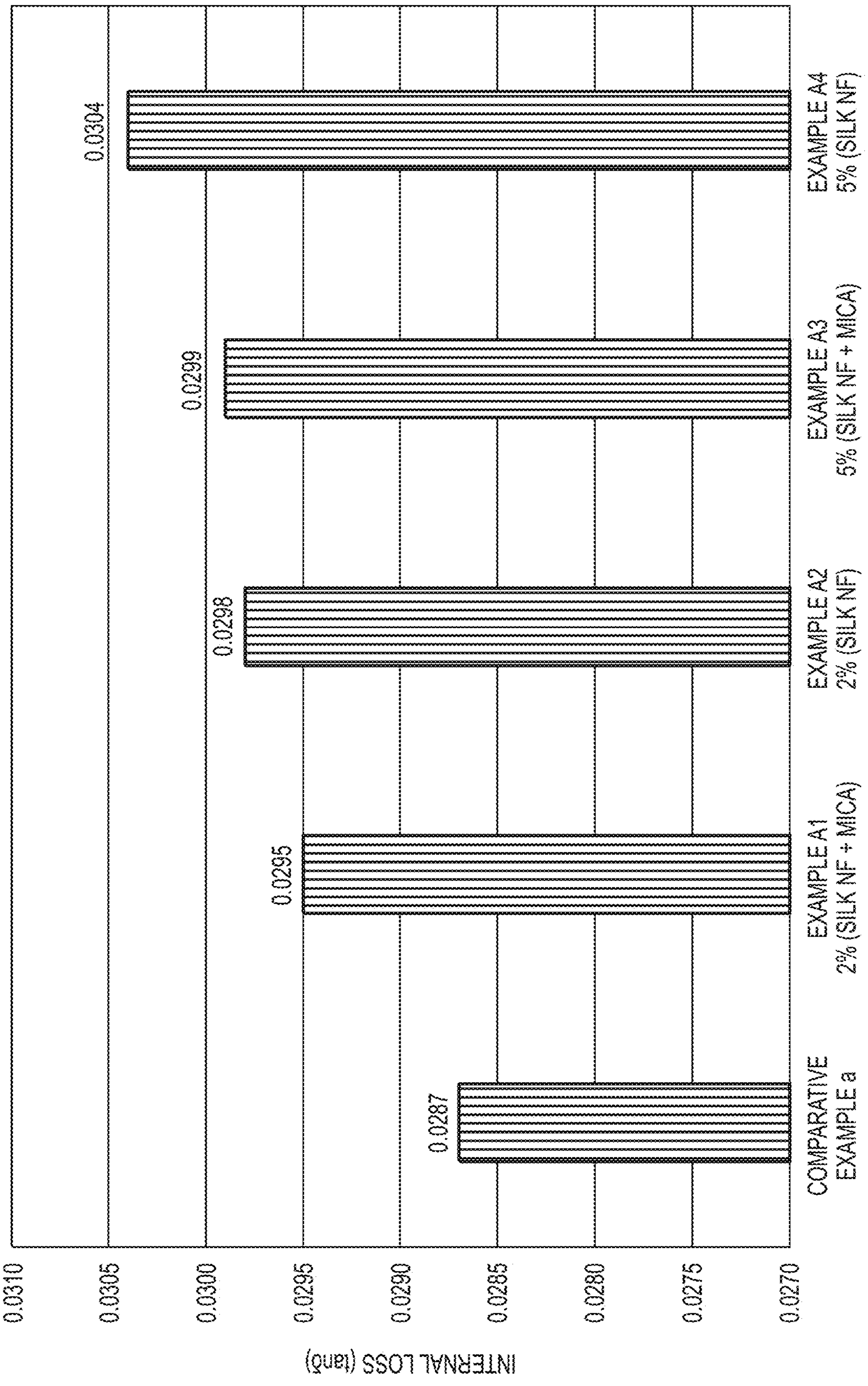
FIG. 7 is a graph comparing an internal loss of Comparative Example a and Examples A1 to A4 according to the embodiment of the present invention.

Physical properties (Young's modulus and internal loss (tan δ)) of the samples of Comparative Example a and Examples A1 to A4 measured by a vibration reed method will be described with reference to FIGS. 6 and 7. FIG. 6 shows a measured average value (n=10) of the Young's modulus, and FIG. 7 shows a measured average value (n=10) of the internal loss.

First, the Young's modulus will be described. As is clear from FIG. 6, in Examples A1 to A4 having the mixed layer in which silk nanofibers are mixed in the base material, the Young's modulus is lower than that of Comparative Example a. As can be seen from a comparison between Comparative Example a, Example A1, and Example A3 and a comparison between Comparative Example a, Example A2, and Example A4, the Young's modulus decreases as the amount of the silk nanofibers increases. Specifically, the Young's modulus of Comparative Example a is 4.19 [GPa], whereas the Young's modulus of Example A1 in which 1.90% by mass of silk nanofibers are mixed is 3.99 [GPa], and the Young's modulus of Example A3 in which 4.75% by mass of silk nanofibers are mixed is 3.94 [GPa]. The Young's modulus of Example A1 is lower than that of Comparative Example a by about 5%, and the Young's modulus of Example A3 is lower than that of Comparative Example a by about 6%. The Young's modulus of Example A2 in which 2.00% by mass of silk nanofibers are mixed is 3.94 [GPa], and the Young's modulus of Example A4 in which 5.00% by mass of silk nanofibers are mixed is 3.74 [GPa]. The Young's modulus of Example A2 is lower than that of Comparative Example a by about 6%, and the Young's modulus of Example A4 is lower than that of Comparative Example a by about 11%. As is clear from a comparison between Example A1 in which 0.10% by mass of mica is mixed and Example A2 in which mica is not mixed and a comparison between Example A3 in which 0.25% by mass of mica is mixed and Example A4 in which mica is not mixed, a decrease in the Young's modulus can be prevented by providing a reinforcing layer in which mica is mixed. In particular, in a comparison between Example A3 and Example A4, the Young's modulus of Example A3 having a reinforcing layer in which mica is mixed is increased by about 5% as compared with Example A4. By using cellulose nanofibers in addition to mica as a reinforcing material and forming a reinforcing layer in which mica and cellulose nanofibers are mixed in a mixed layer, a decrease in the Young's modulus can be further prevented.

Next, a measured value tan δ representing the internal loss will be described. As is clear from FIG. 7, in Examples A1 to A4 having the mixed layer in which silk nanofibers are mixed in the base material, the tan δ is larger than that of Comparative Example a. As can be seen from a comparison between Comparative Example a, Example A1, and Example A3 and a comparison between Comparative Example a, Example A2, and Example A4, the tan δ increases as the amount of silk nanofibers increases. Specifically, the tan δ of Comparative Example a is 0.0287, the tan δ of Example A1 in which 1.90% by mass of silk nanofibers are mixed is 0.0295, and the tan δ of Example A3 in which 4.75% by mass of silk nanofibers are mixed is 0.0299. The tan δ is increased by about 3% in Example A1 and by about 4% in Example A3 with respect to Comparative Example a. The tan δ of Example A2 in which 2.00% by mass of silk nanofibers are mixed is 0.0298, and the tan δ of Example A4 in which 5.00% by mass of silk nanofibers are mixed is 0.0304. The tan δ of Example A2 is increased by about 4% and the tan δ of Example A4 is increased by about 6% with respect to Comparative Example a. Since the silk fibers forming the silk nanofibers are weakly bonded to the cellulose fibers of the base material, the silk nanofibers penetrate between the cellulose fibers, whereby a bonding force between the cellulose fibers can be weakened and an attenuation effect can be enhanced, and thus the internal loss of a diaphragm can be increased. Therefore, in a speaker using the diaphragm, clear sound quality can be obtained. On the other hand, the bonding force between the cellulose fibers is weakened by the silk nanofibers, resulting in a decrease in Young's modulus of the diaphragm, and by adjusting the degree of penetration of the silk nanofibers, it is possible to form a diaphragm in which a decrease in the Young's modulus is prevented and an appropriate internal loss is secured.

In this way, in a diaphragm for an electroacoustic transducer, by forming a mixed layer in which silk nanofibers and a fiber material mainly composed of cellulose fibers are mixed on a base material made of the fiber material, Young's modulus can be maintained and an internal loss property of the base material itself can be improved. The balance between the Young's modulus and the internal loss property can be adjusted according to a mixing amount of the silk nanofibers and the degree of penetration of the mixed layer. In this way, by using the silk nanofibers, it is possible to provide a diaphragm that achieves appropriate Young's modulus and internal loss with respect to physical property values of the base material. Therefore, by using the diaphragm, acoustic characteristics of a speaker can be optimized according to a purpose of the speaker.

By further forming a reinforcing layer in which a reinforcing material such as mica is mixed, it is possible to prevent a decrease in the Young's modulus. In this way, by using the silk nanofibers and the reinforcing material in combination, it is possible to set the internal loss and the Young's modulus of the diaphragm to suitable states.

By spraying a suspension containing silk nanofibers onto one surface of the base material while dehydrating the suspension from the other surface side of the base material by suction, the silk nanofibers can penetrate into the base material, and physical properties (in particular, internal loss) of the base material can be efficiently improved. Since the silk nanofibers have an average fiber diameter smaller than an average fiber diameter of the cellulose fibers, when the silk nanofibers are mixed with the cellulose fibers to prepare a liquid for papermaking in forming a diaphragm, the silk nanofibers pass between the cellulose fibers or through meshes of a papermaking mesh during papermaking and flow out together with papermaking wastewater, and it is difficult to retain the silk nanofibers in the diaphragm. Therefore, by spraying the silk nanofibers to the base material that is made into paper as in the present embodiment, the silk nanofibers can be efficiently retained between the dense cellulose fibers, and a diaphragm in which the silk nanofibers are mixed can be efficiently formed.

By spraying a suspension to form the mixed layer 11, the amount of water used can be minimized. For example, when a general single-layer papermaking diaphragm, a two-layer papermaking diaphragm in which a base material and a surface layer are laminated by papermaking, and a sprayed second layer diaphragm in which a base material is formed by papermaking and a surface layer (mixed layer) is formed by spraying as in the present embodiment are compared, both the two-layer papermaking diaphragm and the sprayed second layer diaphragm are diaphragms having a two-layer structure, but the surface layers have different thickness. For example, the thickness of the surface layer of the two-layer papermaking diaphragm is 10% to 50% of a total thickness (cross section of diaphragm), and the sprayed second layer diaphragm can be formed such that the surface layer has a thickness of 2% to 5% of a total thickness. As for the amount of water used, the amount of papermaking water used for papermaking in the single-layer papermaking diaphragm is several liters. In the two-layer papermaking diaphragm, several liters of water are required for the base material and several liters of water are required for the surface layer papermaking. On the other hand, the amount of water used for the base material of the sprayed second layer diaphragm is several liters, which is not changed, but for the suspension, several grams to several tens of grams are sufficient, and the amount of water used can be greatly reduced compared with the two-layer papermaking diaphragm, which can contribute to a reduction in the amount of wastewater.

In the embodiment and the first example described above, mica is used as a reinforcing material. The reinforcing material is not limited to mica, and other materials having high bending rigidity, materials having high Young's modulus such as carbon fibers and cellulose nanofibers may be used, or these materials may be used in combination as appropriate.

When cellulose nanofibers are used as the reinforcing material, those having a short average fiber length are preferable. When cellulose nanofibers having a short average fiber length are used, the dispersibility of silk nanofibers and the cellulose nanofibers in a suspension is higher than that of cellulose nanofibers having a long average fiber length. Therefore, when the suspension is sprayed onto a front surface of a base material, the silk nanofibers and the cellulose nanofibers can be uniformly sprayed, and the productivity is excellent.

In a case where cellulose nanofibers are used as the reinforcing material, when a suspension containing silk nanofibers and cellulose nanofibers is sprayed onto a front surface of a base material while being dehydrated from a back surface side of the base material by suction, the silk nanofibers penetrate deeply into the base material through gaps between the cellulose fibers, whereas the cellulose nanofibers easily remain at a surface layer of the base material. As a result, a reinforcing layer in which cellulose fibers, silk nanofibers, and cellulose nanofibers are mixed can be formed at a front surface side of a mixed layer. The Young's modulus of cellulose nanofibers is approximately twice higher than that of cellulose fibers such as pulp. Therefore, by using cellulose nanofibers, it is possible to increase an internal loss with silk nanofibers without further decreasing the Young's modulus of a diaphragm, as compared with a case where only mica is used as a reinforcing material.

Second Example

Hereinafter, comparison results of Young's modulus and an internal loss using measurement samples of diaphragms for an electroacoustic transducer of a second example and a comparative example using cellulose nanofibers as a reinforcing material according to the present invention will be described.

Comparative Example b1 uses a measurement sample of a base material made of only cellulose fibers. Comparative Example b2 uses a measurement sample in which a layer in which short cellulose nanofibers are mixed in a base material made of cellulose fibers and a layer in which the cellulose fibers of the base material, short cellulose nanofibers, and mica are mixed in a surface layer of the base material are formed. Comparative Example b3 uses a measurement sample in which a layer in which long cellulose nanofibers are mixed in a base material made of cellulose fibers and a layer in which the cellulose fibers of the base material, long cellulose nanofibers, and mica are mixed in a surface layer of the base material are formed.

Example B1 uses a measurement sample in which a mixed layer in which cellulose fibers and silk nanofibers are mixed in a base material made of cellulose fibers and a reinforcing layer in which the cellulose fibers of the base material, silk nanofibers, and mica are mixed in a surface layer of the base material are formed. Example B2 uses a measurement sample in which a mixed layer in which silk nanofibers are mixed in a base material made of cellulose fibers and a reinforcing layer in which short cellulose nanofibers of the base material, silk nanofibers, and mica are mixed in a surface layer of the base material are formed. Example B3 uses a measurement sample in which a mixed layer in which silk nanofibers are mixed in a base material made of cellulose fibers and a reinforcing layer in which long cellulose nanofibers of the base material, silk nanofibers, and mica are mixed in a surface layer of the base material are formed.

Conditions of the measurement samples in Comparative Examples b1 to b3 and Examples B1 to B3 (masses of nanofibers and mica relative to mass of measurement sample: % by mass) are shown in Table 2.

TABLE 2

| | Comparative Example b1 | Comparative Example b2 | Comparative Example b3 | Example B1 | Example B2 | Example B3 |
|---|---|---|---|---|---|---|
| Short cellulose nanofibers | None | 1.90% | None | None | 0.95% | None |
| Long cellulose nanofibers | None | None | 1.90% | None | None | 0.95% |
| Silk nanofibers | None | None | None | 1.90% | 0.95% | 0.95% |
| Mica | None | 0.10% | 0.10% | 0.10% | 0.10% | 0.10% |

Each of the prepared measurement samples is prepared such that a total sample mass (basis weight) is constant at 150 g/m$^2$, and is cut into a sample having a length of 40 mm and a width of 5 mm. The second example is different from the first example in papermaking conditions (papermaking conditions, pressing conditions, basis weight, and the like), and physical property data cannot be compared in an integrated manner between the first example and the second example.

The measurement samples of Comparative Examples b2 and b3 and Examples B1 to B3 are formed by making the cellulose fibers of the base material into paper with a papermaking mesh, and then spraying a suspension having an adjusted mass ratio of the nanofibers to the mica of 95:5 onto a front surface of the base material while dehydrating the suspension from a back surface side of the base material by suction. More specifically, the suspension is adjusted such that a mass ratio of the short cellulose nanofibers to the mica is 95:5 in Comparative Example b2, a mass ratio of the long cellulose nanofibers to the mica is 95:5 in Comparative Example b3, a mass ratio of the silk nanofibers to the mica is 95:5 in Example B1, a mass ratio of the short cellulose nanofibers to the silk nanofibers to the mica is 47.5:47.5:5 in Example B2, and a mass ratio of the long cellulose nanofibers to the silk nanofibers to the mica is 47.5:47.5:5 in Example B3.

In Comparative Example b2, the suspension is sprayed such that masses of the short cellulose nanofibers and the mica are 2.00% by mass of the total sample mass, the short cellulose nanofibers are 1.90% by mass of the total sample mass, and the mica is 0.10% by mass of the total sample mass. Similarly, in Comparative Example b3, the suspension is sprayed such that masses of the long cellulose nanofibers and the mica are 2.00% by mass of the total sample mass, the long cellulose nanofibers are 1.90% by mass of the total sample mass, and the mica is 0.10% by mass of the total sample mass.

In Example B1, the suspension is sprayed such that masses of the silk nanofibers and the mica are 2.00% by mass of the total sample mass, the silk nanofibers are 1.90% by mass of the total sample mass, and the mica is 0.10% by mass of the total sample mass. Example B2 is formed by spraying the suspension such that masses of the short cellulose nanofibers, the silk nanofibers and the mica are 2.00% by mass of the total sample mass, both the short cellulose nanofibers and the silk nanofibers are 0.95% by mass of the total sample mass, and the mica is 0.10% by mass of the total sample mass. Example B3 is formed by spraying the suspension such that masses of the long cellulose nanofibers, the silk nanofibers, and the mica are 2.00% by mass of the total sample mass, both the long cellulose nanofibers and the silk nanofibers are 0.95% by mass of the total sample mass, and the mica is 0.10% by mass of the total sample mass.

In the base materials of Comparative Examples b1 to b3 and Examples B1 to B3, a mixture of 50% by mass of NUKP and 50% by mass of kenaf beaten at a beating degree of 20° SR is used as the cellulose fibers.

As the silk nanofibers of Examples B1 to B3, Model KCo-30005 manufactured by SUGINO MACHINE LIMITED CO., LTD. was used. The silk nanofibers are refined to have an average fiber diameter of about 100 nm and an average fiber length of 10 μm or less by loosening silk fibers with a mechanical impact force. As the mica of Comparative Examples b2 and b3 and Examples B1 to B3, model MS-100R manufactured by Nihon Koken Kogyo Co., Ltd. was used. The mica has a grain size of 20 μm to 100 μm, and natural mica is used as a base and coated with titanium oxide and iron oxide to impart gloss. As the short cellulose nanofibers of Comparative Example b2 and Example B2, Model FMa-10010 manufactured by SUGINO MACHINE LIMITED CO., LTD. was used. The short cellulose nanofibers are refined to have an average fiber diameter of about 10 nm to 50 nm by loosening cellulose fibers with a mechanical impact force. As the long cellulose nanofibers of Comparative Example b3 and Example B3, Model IMa-10005 manufactured by SUGINO MACHINE LIMITED CO., LTD. was used. The long cellulose nanofibers are refined to have an average fiber diameter of about 10 nm to 50 nm by loosening cellulose fibers with a mechanical impact force, and have an average fiber length longer than that of the short cellulose nanofibers.

Figure 8:
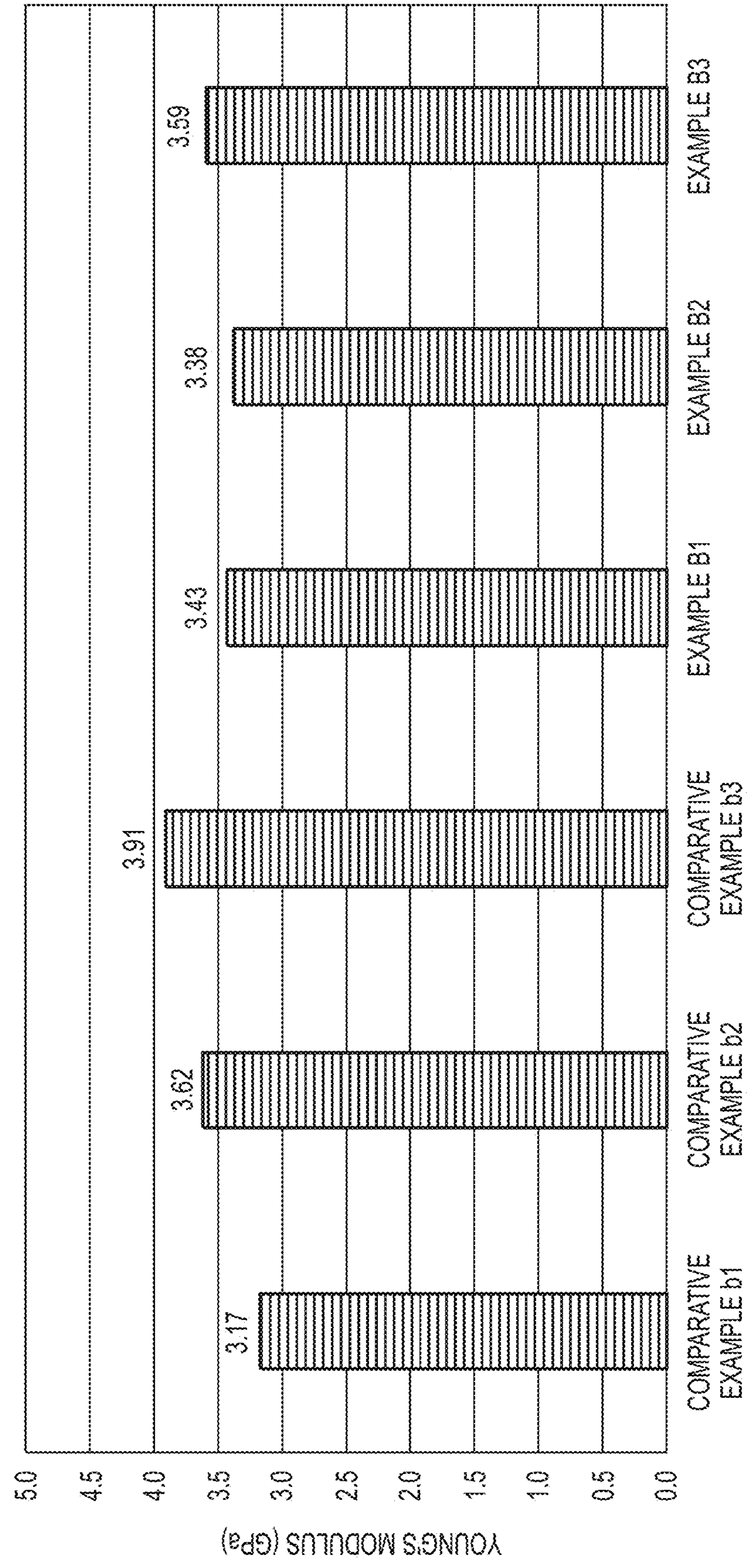
FIG. 8 is a graph comparing a Young's modulus of Comparative Examples b1 to b3 and Examples B1 to B3 according to the embodiment of the present invention.
Figure 9:
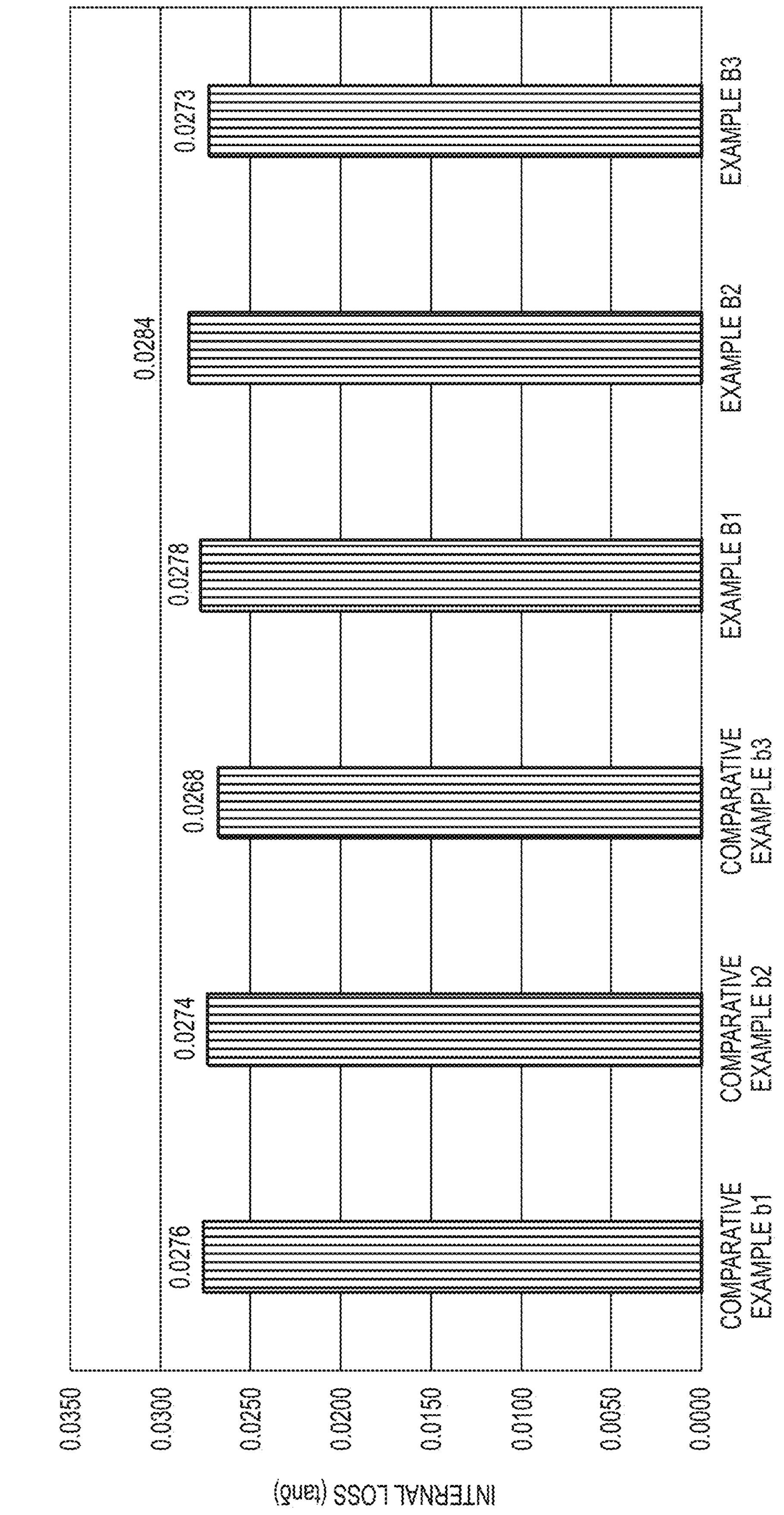
FIG. 9 is a graph comparing an internal loss of Comparative Examples b1 to b3 and Examples B1 to B3 according to the embodiment of the present invention.

Physical properties (Young's modulus and internal loss (tan δ)) of the samples of Comparative Examples b1 to b3 and Examples B1 to B3 measured by a vibration reed method will be described with reference to FIGS. 8 and 9. FIG. 8 shows a measured average value (n=10) of the Young's modulus, and FIG. 9 shows a measured average value (n=10) of the internal loss.

First, the Young's modulus will be described. As is clear from FIG. 8, in Examples B1 to B3, since the silk nanofibers are mixed in the base material, the Young's modulus is lower than that of Comparative Examples b2 and b3 in which only the cellulose nanofibers are mixed. Among Examples B1 to B3, Example B2 in which the short cellulose nanofibers and the silk nanofibers are mixed has the lowest Young's modulus (3.38 [GPa]), Example B2 in which only the silk nanofibers are mixed has the second lowest Young's modulus (3.43 [GPa]), and Example B3 in which the long cellulose nanofibers and the silk nanofibers are mixed has the highest Young's modulus (3.59 [GPa]).

In Example B2, since the short cellulose nanofibers are mixed in the base material together with the silk nanofibers, the short cellulose nanofibers prevent the permeation of the silk nanofibers into gaps between the cellulose fibers. As a result, since the silk nanofibers can be efficiently retained in the surface layer of the base material, a bonding force between the cellulose fibers and the cellulose nanofibers in the surface layer is weakened, and the Young's modulus of the entire diaphragm is reduced as compared with Comparative Examples b2 and b3.

In Example B3, since the long cellulose nanofibers are mixed in the base material together with the silk nanofibers, the silk nanofibers having high dispersibility can be efficiently retained in the surface layer without penetrating into the diaphragm.

Next, tan δ representing the internal loss will be described. As is clear from FIG. 9, when only the cellulose nanofibers are mixed in the base material as in Comparative Examples b2 and b3, the tan δ decreases. On the other hand, the tan δ can be increased by mixing silk nanofibers.

For example, the tan δ (0.0284) of Example B2 in which the short cellulose nanofibers and the silk nanofibers are mixed is larger than the tan δ (0.0274) of Comparative Example b2 in which only the short cellulose nanofibers are mixed. This tan δ is higher than the tan δ (0.0278) of Example B1 in which only the silk nanofibers are mixed.

The tan δ (0.0273) of Example B3 in which the long cellulose nanofibers and the silk nanofibers are mixed is larger than the tan δ (0.0268) of Comparative Example b3 in which only the long cellulose nanofibers are mixed.

Since the silk nanofibers are weakly bonded to the cellulose fibers of the base material and can have a high attenuation effect, the internal loss of a diaphragm can be increased. Therefore, in a speaker using the diaphragm, clear sound quality can be obtained.

Figure 10:
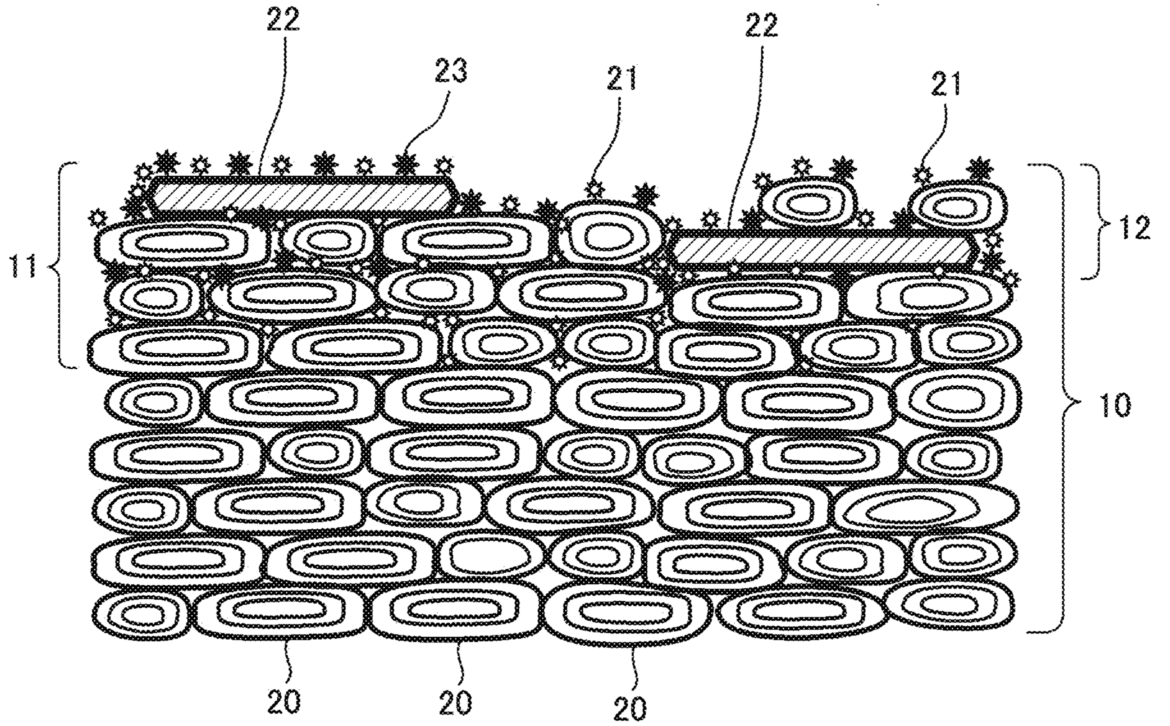
FIG. 10 is a schematic view of a cross section of a diaphragm according to Example B3 of the present invention.
Figure 11:
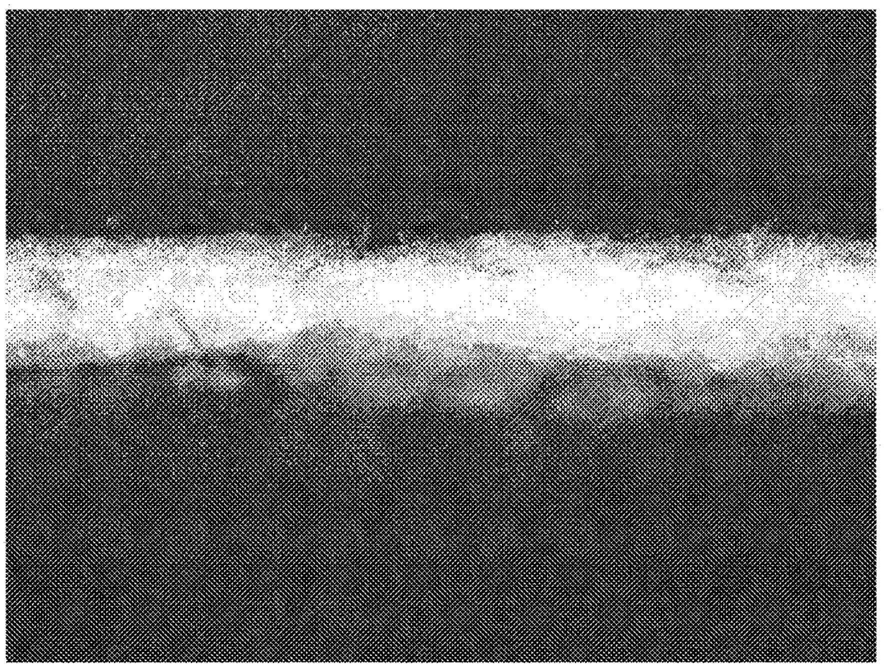
FIG. 11 is an enlarged image of the cross section of the diaphragm according to Example B3 of the present invention.
Figure 12:
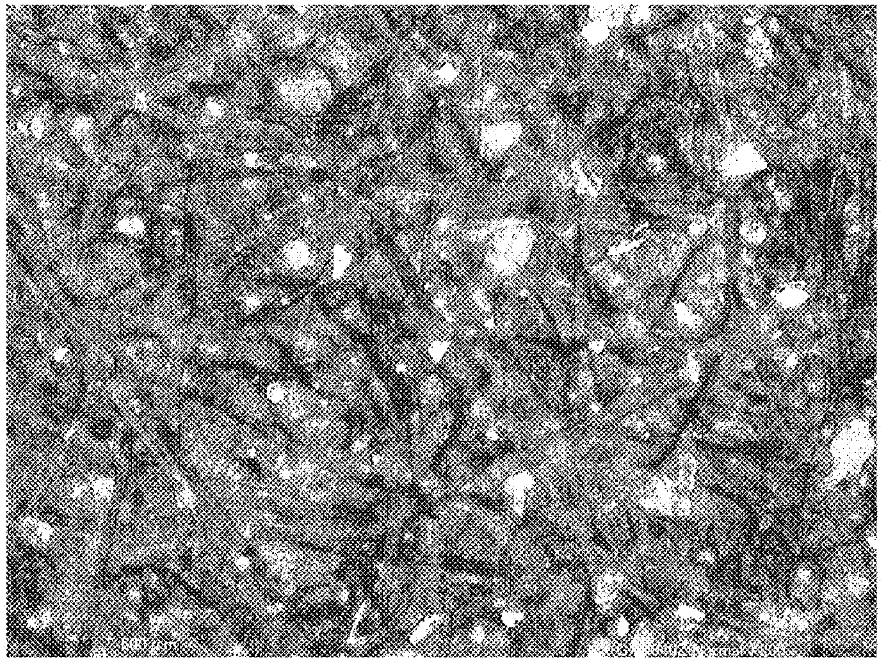
FIG. 12 is an enlarged image of a surface of the diaphragm according to Example B3 of the present invention.

Next, FIGS. 10 and 11 are a schematic view of a cross section of a diaphragm according to Example B3 of the present invention and an enlarged image taken with a microscope, and FIG. 12 is an enlarged image of a surface of the diaphragm according to Example B3 taken with a microscope. In FIG. 11, in order to make it easier to identify the mixed layer 11 and the reinforcing layer of the base material 10, the diaphragm 1 is formed by staining the silk nanofibers 21 in red and staining the cellulose nanofibers 23 in black without staining the cellulose fibers 20 of the base material 10.

As shown in FIGS. 10 and 11, it can be seen that the surface of the diaphragm is colored densely, and in Example B3, a large amount of the long cellulose nanofibers 23 remains at the surface of the base material 10. As shown in FIG. 12, it can be observed that the glossy mica 22 is uniformly distributed at the surface of the diaphragm, and the silk nanofibers 21, the cellulose nanofibers 23, and the mica 22 are disposed at the surface of the diaphragm. In FIG. 11, a range colored lightly indicates the mixed layer in which silk nanofibers are mixed. As described above, in Example B3, it can be seen that the permeation of the silk nanofibers 21 into the base material 10 is shallow as compared with the diaphragms of FIGS. 3 and 5 in which cellulose nanofibers are not mixed. By mixing the long cellulose nanofibers 23 and the silk nanofibers 21 in this manner, the silk nanofibers 21 can be retained in the surface layer without penetrating into the diaphragm. As a result, the gaps between the cellulose fibers 20 of the base material 10 can be efficiently filled in the surface layer of the diaphragm, and a diaphragm with a high surface layer density can be formed. By mixing cellulose nanofibers and the silk nanofibers 21, the amount of the silk nanofibers 21 used can be reduced. Since the diaphragm with a high surface layer density can suppress ventilation and efficiently transmit vibration to the air, a sound pressure can be improved.

By mixing not only mica but also cellulose nanofibers in silk nanofibers as reinforcing materials as in the second examples B2 and B3, it is possible to manufacture a diaphragm with improved sound pressure and excellent balance between the Young's modulus and the internal loss.

In each of the second examples B1 to B3, mica is mixed, but even when mica is not contained, the same effect can be obtained in the tendency of the Young's modulus and the internal loss. By disposing silk nanofibers at the surface of the diaphragm, it is possible to enhance the deterioration in weather resistance of pulp against ultraviolet rays, and it is possible to prevent discoloration and embrittlement of the diaphragm.

Although the embodiment and examples of the present invention have been described above, aspects of the present invention are not limited to the embodiment and examples.

In the above embodiment and examples, the diaphragm 1 has a cone shape, and may have other diaphragm shapes such as a dome shape. The mixed layer and the reinforcing layer may be formed not only at the front surface side but also at the back surface side of the base material, or may be formed only at the back surface side.

When simply referred to as a diaphragm, the diaphragm as a speaker refers to a configuration including an edge, but the diaphragm referred to in the present embodiment refers to a body portion excluding the edge.

The cellulose fibers of the base material to be made into paper and the nanofibers in the suspension containing the silk nanofibers or the like may be stained with a dye or the like, or may be subjected to sizing treatment or waterproofing treatment.

In addition to the cellulose fibers, other materials such as carbon fibers, fine carbon powder, bacterial cellulose, and the like may be mixed in the base material to be made into paper.

REFERENCE SIGNS LIST

1 Diaphragm for electroacoustic transducer
10 Base material
11 Mixed Layer
12 Reinforcing layer
20 Cellulose fiber (fiber material)
21 Silk nanofiber
22 Mica

The invention claimed is:

1. A diaphragm for an electroacoustic transducer, wherein, in a base material made of a fiber material mainly composed of cellulose fibers, a mixed layer in which the fiber material and silk nanofibers are mixed is formed, wherein the base material is a paper-made body, wherein the mixed layer is formed at a surface layer side of the base material, wherein the mixed layer is formed by spraying a suspension containing the silk nanofibers onto one surface of the base material while dehydrating the suspension from other surface side of the base material by suction, wherein an average fiber diameter of the cellulose fibers is from 5 μm to 90 μm, and wherein the silk nanofibers have a smaller average fiber diameter than the average fiber diameter of the cellulose fibers, and enter between the cellulose fibers.

2. The diaphragm for the electroacoustic transducer according to claim 1, wherein the silk nanofibers have an average fiber length of 10 μm or less.

3. The diaphragm for the electroacoustic transducer according to claim 2, wherein a reinforcing layer in which the fiber material, the silk nanofibers, and a reinforcing material are mixed is further formed at a surface layer of the base material.

4. The diaphragm for the electroacoustic transducer according to claim 1, wherein a reinforcing layer in which the fiber material, the silk nanofibers, and a reinforcing material are mixed is further formed at a surface layer of the base material.

5. The diaphragm for the electroacoustic transducer according to claim 4, wherein the reinforcing material is made of a material containing mica.

6. The diaphragm for the electroacoustic transducer according to claim 4, wherein the reinforcing material is made of a material containing cellulose nanofibers.

7. The diaphragm for the electroacoustic transducer according to claim 5, wherein the reinforcing material is made of a material containing cellulose nanofibers.

8. The diaphragm for the electroacoustic transducer according to claim 4, wherein the reinforcing layer is formed in the mixed layer by spraying a suspension containing the reinforcing material and the silk nanofibers onto one surface of the base material while dehydrating the suspension from other surface side of the base material by suction.

9. The diaphragm for the electroacoustic transducer according to claim 6, wherein the cellulose nanofibers have an average fiber diameter of from 10 to 50 nm.

10. The diaphragm for the electroacoustic transducer according to claim 4, wherein the average fiber diameter of the silk nanofibers is smaller than a grain size of the reinforcing material.

* * * * *